Patented May 9, 1939

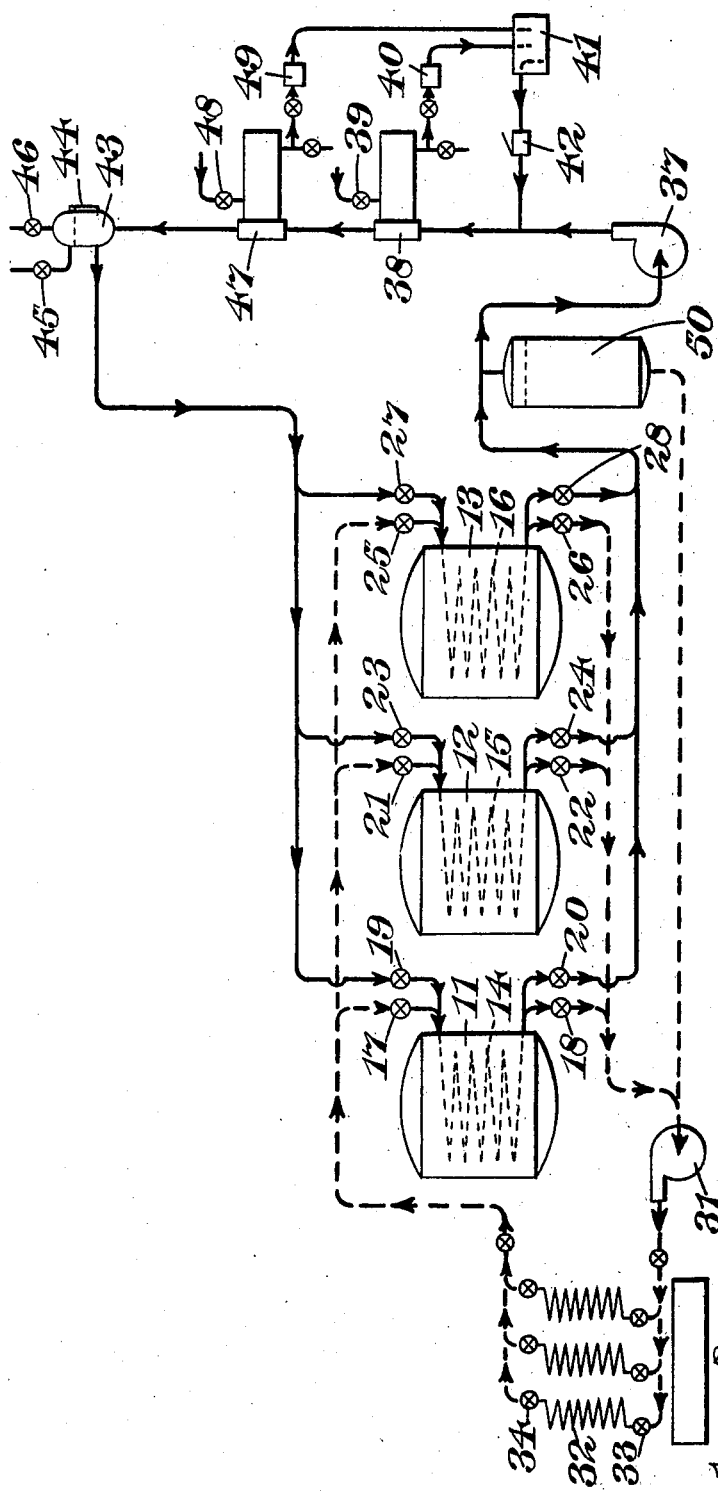

2,157,565

UNITED STATES PATENT OFFICE 2,157,565

TREATMENT OF GASES WITH ADSORBENT SOLIDS

Stuart Pexton, William Kenneth Hutchison, and Falconer Moffat Birks, London, England, assignors to The Gas Light & Coke Company, Westminster, London, England, a British company Application February 17, 1937, Serial No. 126,290
In Great Britain February 20, 1936

5 Claims. (Cl. 183—4)

This invention is for improvements in or relating to the treatment of gases with adsorbent solids and has particular reference to the selective removal of certain gases or vapours from a mixture of gases by passing the gases through adsorbent solids such as active charcoal or silica gel.

During the process of adsorption is it advantageous to cool the adsorbent solid and in order to recover the vapours adsorbed it is common practice to pass steam directly through the solid at the same time heating the solid to prevent excessive condensation of water. The cooling and heating of the solid can be conveniently effected by means of pipe coils arranged in the adsorption vessel.

The low thermal conductivity of the adsorbent solid and the low rate of transfer of heat from the coils to the surrounding gas makes it necessary to arrange that the coils consist of a large number of closely spaced pipes. Thus, in a typical adsorber having steel pipes of about 1½ inches external diameter the distance between the coils is of the order of 2 inches. It is necessary, therefore, to employ the same coils both for the heating and cooling of the adsorbent. The cooling medium is generally cold water and the heating medium is generally steam condensing under a suitable pressure, e. g. of the order of 30 to 100 lbs. per square inch.

It has been found that when steam and cold water respectively are employed for the heating and cooling stages the coils corrode rapidly, particularly at the points of entry and exit of the steam and the water, and it is believed that this is due to the successive action of fluids of different salt and oxygen content. In a plant in which the coils were heated by means of steam and cooled by means of water drawn from an atmospheric cooler, the coils were rendered useless by corrosion and perforation in a time of the order of six weeks.

We have now found that corrosion may be minimised by supplying the coils with a source or sources of water kept continually in circulation in closed circuits protected from contact with air, hot water under pressure being passed through the coils when the adsorber is to be heated, and cold water when the adsorber is to be cooled.

The present invention accordingly comprises a method of alternately heating and cooling vapour- or gas-adsorbing solid by heat transfer from a fluid which comprises employing as the heat transfer fluid water substantially free from dissolved air or oxygen circulated in one or more closed circuits. The water employed is preferably distilled water which is maintained at the desired temperature by heaters and coolers of the indirect type, i. e. of the type in which the heating or cooling means (e. g. steam and cold water respectively) do not come into direct contact with the water to be heated or cooled. Thus, water under pressure may be heated in an indirect steam heater to a temperature between 130° C. and 140° C. and circulated through the coils by means of a pump.

In one preferred form of apparatus for carrying the invention into effect two pumps may be used, one supplying hot water and the other supplying cooled water (which may be at a temperature of the order of 20° C.) to the coils of the adsorber, the hot and cold water circuits outside the adsorber being maintained separate.

An expansion tank may be provided in the hot water circuit, preferably between the heater and the adsorber coils and containing in equilibrium hot water and steam under pressure. By means of this expansion tank the hot water may be kept out of contact with air and may be rendered air-free (if not originally in that condition) by blowing off small quantities of steam from time to time from the expansion tank.

The hot and cold water circuits may each be provided with a storage tank. The hot water storage tank is arranged to receive the hot water with which the coils of the adsorber are full at the time when it is desired to commence cold water circulation and the cold water storage tank is similarly arranged to receive the cold water with which the coils are full when heating is to commence. The cold water storage tank may have above the water, nitrogen under a pressure of the same order as that of the steam in the hot water tank. The hot and cold water may be subsequently used for circulation through the same or another adsorber. In an alternative form of apparatus a single storage tank may be provided, hot water being returned to the top of the tank and cold water to the bottom. The different densities of hot and cold water may be relied on to prevent the hot and cold layers from mixing but baffles may be included to minimise any mixing due to turbulence set up at the water inlets and outlets.

The present invention also comprises apparatus for carrying out the method described above which comprises one or more adsorption chambers each containing a heat exchange coil and a pump or pumps for circulating hot and cold water at will through the coil. There may be provided outside the adsorption vessel a storage vessel or storage vessels for the heating and cooling water.

It has been found that by this invention the corrosion in the heat transfer coils of the adsorption vessel as well as in the indirect heating and cooling apparatus will be minimised or prevented altogether. Thus, in a plant from which oxygen was excluded from the heating and cooling circuits no evidence of corrosion of the coils was observed over a period of many months.

Following is a description by way of example and with reference to the accompanying diagrammatic drawing of methods of carrying the invention into effect.

The drawing shows apparatus in which three benzole adsorption vessels are connected with a single storage tank for hot and cold water.

In the drawing there is shown a series of three adsorbing vessels 11, 12 and 13 such as are used for the removal of benzol from coal gas by means of active carbon (the inlet and outlet pipes for the gas and for the steam for removing the benzol from the active carbon being omitted). The adsorbers are provided with coils 14, 15 and 16 for the circulation of heating or cooling fluid. Cold water valves 17, 18, 21, 22, 25 and 26 and hot water valves 19, 20, 23, 24, 27 and 28. The cold water inlet valves 17, 21 and 25 are connected to a common pipe line from the rack cooler 32 and the cold water outlet valves 18, 22 and 26 are connected to a common pipe line leading to the inlet side of the centrifugal pump 31. Similarly, the hot water inlet valves 19, 23 and 27 and the outlet valves 20, 24 and 28 are connected to common pipe lines, the former being connected to the expansion vessel 43 and the latter to the top of a storage tank 50. The lower part of the storage tank 50 is connected to the inlet side of the cold water pump 31.

The hot water circuit contains two indirect steam heaters 38 and 47. The condensed steam passes through steam traps 40 and 49 to a common condensed water storage tank 41 from whence the air-free water may be introduced into the system through the hand pump 42 to make up for any loss of water during working.

The apparatus illustrated and described includes a series of three benzole adsorbers to be operated in sequence. A single storage vessel is provided for hot and cold water, the hot water forming a layer above the cold water. Baffles (not shown) may, if desired, be provided in the storage chamber to prevent circulation of the water. The method of operation of such a system is as follows:—Assuming that adsorbers 11 and 12 are adsorbing benzole (and their coils 14 and 15 are therefore being supplied with cold water) and that adsorber 13 is being steamed for the removal of benzole (and is therefore supplied with hot water) and that it is now desired to pass steam through the adsorber 11 for the removal of benzole therefrom and to pass gas through the adsorber 13, valves 17, 18, 21, 22, 27 and 28 will initially be open and valves 19, 20, 23, 24, 25 and 26 shut. The storage tank 50 will be full of hot water from a previous steaming operation. Valve 17 is first closed and valve 19 open. The cold water contained in the coil 14 will thus be forced through valve 18 to the inlet side of pump 31 whence it passes to the bottom of the storage vessel 50. As soon as warm water commences to pass through valve 18 this valve is closed and valve 20 opened so that the hot water passes back to the pump 31 and recirculates through the hot water system. The coils of adsorbers 11 and 13 are now full of hot water and steaming of the adsorber 11 can be commenced. The tank 50 contains cold water and the next step is to transfer this cold water to the coil 16 of adsorber 13 so that this adsorber may be used for adsorption again. Valve 27 is first closed and valve 25 opened. The hot water in the coil 16 is thus transferred to the upper portion of the tank 50 through the valve 28 and this operation can be continued until as much heat as is required has been recovered from the adsorber 13. Valve 28 is then closed and valve 26 opened so that the circulation of cold water takes place through the coil 16 and the vessel is ready for the adsorption of benzole. Adsorbers 12 and 13 are now taking gas while adsorber 11 is being steamed for removal of benzoles. By a similar change of valves, the adsorber 12 may in its turn be subjected to steaming.

We claim:

1. Apparatus for alternately cooling and heating vapor- or gas-adsorbing solid by heat transfer from water substantially free from dissolved air or oxygen circulated through pipes embedded in the said solid which comprises at least one chamber containing adsorbent solid, a heat-exchange coil within said adsorption chamber and embedded in said solid, closed heating and cooling circuits external to the adsorption chamber and each including the heat-exchange coil in said adsorption chamber, valved means for connecting the heat-exchange coil at will with the said external heating or cooling circuit, means for circulating hot and cold water at will through the heat-exchange coil and a single closed storage vessel for hot and cold water the top portion of which is connected to the heating circuit and the bottom portion of which is connected to the cooling circuit.

2. Apparatus for alternately cooling and heating vapor- or gas-adsorbing solid by heat transfer from water substantially free from dissolved air or oxygen circulated through pipes embedded in the said solid which comprises at least one chamber containing adsorbent solid, a heat-exchange coil within said adsorption chamber and embedded in said solid, closed heating and cooling circuits external to the adsorption chamber and each including the heat-exchange coil in said adsorption chamber and a common storage chamber for hot and cold water, a pipe connection between the top of the storage chamber and the heating circuit, a pipe connection between the bottom of the storage chamber and the cooling circuit, valved means for connecting the heat-exchange coil at will with the said external heating or cooling circuit and at least one pump for circulating hot and cold water at will through the heat-exchange coil.

3. Apparatus for alternately cooling and heating vapor- or gas-adsorbing solid by heat transfer from water substantially free from dissolved air or oxygen which comprises at least one adsorption chamber to contain vapor- or gas-adsorbing solid, a heat-exchange coil embedded in said solid and operatively connected to external closed circuits each connected to the said heat-exchange coil and to a common storage vessel for hot and cold water, a pipe connection between the top of the storage chamber and the heating circuit, a pipe connection between the bottom of the storage chamber and the cooling circuit, means for cooling the water passing through one of the external circuits, means for heating the water passing through the other external circuit, valves for connecting one circuit or the other at wall with the said heat-exchange coil and means for forcing the cooling or heating water through one or other of the said circuits at will.

4. Apparatus for alternately cooling and heating vapor- or gas-adsorbing solid by heat transfer from water substantially free from dissolved air or oxygen which comprises at least one adsorption chamber to contain vapor- or gas-adsorbing solid, a heat-exchange coil embedded in said solid and operatively connected to external closed circuits each connected to the said heat-exchange coil and to a common storage vessel for hot and cold water, a pipe connection between the top of the storage chamber and the heating circuit, a pipe connection between the bottom of the storage chamber and the cooling circuit, means for cooling the water passing through one of the external circuits, means for heating the water passing through the other external circuit, valves for connecting one circuit or the other at will with the said heat-exchange coil and at least one pump for forcing the cooling or heating water through one or other of the said circuits at will.

5. Apparatus for alternately cooling and heating vapor- or gas-adsorbing solid by heat transfer from water substantially free from dissolved air or oxygen which comprises at least one adsorption chamber to contain vapor- or gas-adsorbing solid, a heat-exchange coil embedded in said solid and operatively connected to external closed circuits each connected to the said heat-exchange coil and to a common storage vessel for hot and cold water, a pipe connection between the top of the storage chamber and the heating circuit, a pipe connection between the bottom of the storage chamber and the cooling circuit, means for cooling the water passing through one of the external circuits, means for heating the water passing through the other external circuit, valves for connecting one circuit or the other at will with the said heat-exchange coil and a pump in each of the said external circuits for forcing the cooling or heating water through their respective circuits at will.

STUART PEXTON.
WILLIAM KENNETH HUTCHISON.
FALCONER MOFFAT BIRKS.